US012776950B2

(12) United States Patent
Estevez

(10) Patent No.: US 12,776,950 B2
(45) Date of Patent: Oct. 27, 2026

(54) TELECOMMUNICATION NETWORKS

(71) Applicant: SAMSUNG ELECTRONICS CO., LTD., Suwon-si (KR)

(72) Inventor: David Gutierrez Estevez, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 18/815,280

(22) Filed: Aug. 26, 2024

(65) Prior Publication Data

US 2024/0422055 A1 Dec. 19, 2024

Related U.S. Application Data

(63) Continuation of application No. 17/274,749, filed as application No. PCT/KR2019/011842 on Sep. 11, 2019, now Pat. No. 12,101,223.

(30) Foreign Application Priority Data

Sep. 11, 2018 (GB) ..................................... 1814753

(51) Int. Cl.
*H04L 41/08* (2022.01)
*H04L 41/0806* (2022.01)
(Continued)

(52) U.S. Cl.
CPC ...... *H04L 41/0816* (2013.01); *H04L 41/0806* (2013.01); *H04L 41/16* (2013.01);
(Continued)

(58) Field of Classification Search
CPC . H04L 41/0816; H04L 41/0806; H04L 41/16; H04W 24/02
See application file for complete search history.

(56) References Cited

U.S. PATENT DOCUMENTS 9,204,329 B2 12/2015 Boyle et al.
9,311,160 B2 4/2016 Parker
(Continued)

FOREIGN PATENT DOCUMENTS

CN 106921996 A 7/2017
CN 107135502 A 9/2017
(Continued)

OTHER PUBLICATIONS

Next Generation Mobile Networks, "RAN functional split and x-haul", 3GPP TSG-RAN WG3#99Bis, Apr. 16-20, 2018, R3-181602, 49 pages.
(Continued)

*Primary Examiner* — Curtis B Odom

(57) ABSTRACT

The present disclosure relates to a method and system for converging a 5th-Generation (5G) communication system for supporting higher data rates beyond a 4th-Generation (4G) system with a technology for Internet of Things (IoT). The system may be applied to intelligent services based on the 5G communication technology and the IoT-related technology, such as smart home, smart building, smart city, smart car, connected car, health care, digital education, smart retail, security and safety services. The method includes a method for configuring a base station in a telecommunication network. The base station includes a central unit (CU) and a distributed unit (DU). The CU is arranged to perform virtualized network functions (VNFs). The CU includes an artificial intelligence (AI) engine operable to learn from computational metrics and to adjust the configuration of various VNFs, wherein an F1 interface is used to exchange computational metrics between the CU and the DU.

18 Claims, 7 Drawing Sheets

(51) Int. Cl.

| | |
|---|---|
| ***H04L 41/0816*** | (2022.01) |
| ***H04L 41/16*** | (2022.01) |
| ***H04W 24/02*** | (2009.01) |
| *H04W 88/08* | (2009.01) |
| *H04W 92/12* | (2009.01) |

(52) U.S. Cl.
CPC .......... *H04W 24/02* (2013.01); *H04W 88/085* (2013.01); *H04W 92/12* (2013.01)

(56) References Cited

U.S. PATENT DOCUMENTS

| | | | | |
|---|---|---|---|---|
| 9,788,211 | B2 | 10/2017 | Zhang | |
| 2017/0181021 | A1 | 6/2017 | Yoon et al. | |
| 2017/0279635 | A1 | 9/2017 | Kerpez | |
| 2018/0246746 | A1 | 8/2018 | Miller et al. | |
| 2019/0280918 | A1 | 9/2019 | Hermoni et al. | |
| 2019/0357084 | A1* | 11/2019 | Chou | H04L 41/0806 |
| 2020/0034165 | A1 | 1/2020 | Chou et al. | |
| 2020/0045583 | A1 | 2/2020 | Kim et al. | |
| 2020/0244320 | A1 | 7/2020 | Wang et al. | |

FOREIGN PATENT DOCUMENTS

| | | | |
|---|---|---|---|
| CN | 107889155 | A | 4/2018 |
| CN | 108039903 | A | 5/2018 |
| EP | 3522589 | A1 | 8/2019 |
| KR | 20180039567 | A | 4/2018 |
| WO | 2016032466 | A1 | 3/2016 |
| WO | 2018169884 | A1 | 9/2018 |
| WO | 2018203736 | A1 | 11/2018 |
| WO | 2019006649 | A1 | 1/2019 |
| WO | 2020055172 | A1 | 3/2020 |

OTHER PUBLICATIONS

"Cloud RAN and MEC: A Perfect Pairing", ETSI White Paper No. 23, First edition, Feb. 2018, 24 pages.
Pfitscher et al., "A Model for Quantifying Performance Degradation in Virtual Network Function Service Chains", IEEE, 2018, 9 pages.
Jacobs et al., "Artificial Neural Network Model to Predict Affinity for Virtual Network Functions", IEEE, 2018, 9 pages.
"3rd Generation Partnership Project; Technical Specification Group Services and System Aspects; Telecommunication management; Study on management aspects of virtualized network functions that are part of the New Radio (NR) (Release 15)", 3GPP TR 32.864 V15.0.0 (Jan. 2018), 30 pages.
"3rd Generation Partnership Project; Technical Specification Group Services and System Aspects; System architecture for the 5G System (5gs); Stage 2 (Release 16)", 3GPP TS 23.501 V16.7.0 (Dec. 2020), 450 pages.
"Network Functions Virtualisation (NFV); Terminology for Main Concepts in NFV", ETSI GS NFV 003 V1.4.1 (Aug. 2018), 21 pages.
Gutierrez-Estevez et al., "The Path Towards Resource Elasticity for 5G Network Architecture", IEEE Wireless Communications and Networking Conference Workshops, Apr. 15-18, 2018, 7 pages.
Nikaein et al., "OpenAirInterface: A Flexible Platform for 5G Research", ACM SIGCOMM Computer Communication Review, vol. 44, No. 5, Oct. 2014, 6 pages.
"3rd Generation Partnership Project; Technical Specification Group Radio Access Network; NG-RAN; Architecture description (Release 16)", 3GPP TS 38.401 V16.4.0 (Jan. 2021), 78 pages.
International Search Report dated Dec. 24, 2019 in connection with International Patent Application No. PCT/KR2019/011842, 3 pages.
Written Opinion of the International Searching Authority dated Dec. 24, 2019 in connection with International Patent Application No. PCT/KR2019/011842, 4 pages.
Examination Report under Section 18(3) dated Dec. 16, 2020 in connection with United Kingdom Patent Application No. GB1814753.8, 2 pages.
Combined Search and Examination Report under Sections 17 & 18(3) dated Feb. 21, 2019 in connection with United Kingdom Patent Application No. GB1814753.8, 6 pages.
Marcos Rates Crippa et al., "H2020-ICT-2016-2 5G MoNArch Project No. 761445 5g Mobile Network Architecture for diverse services, use cases, and applications in 5G and beyond", Dec. 1, 2017, 84 pages.
Chin-Lin et al., "The Big-Data-Driven Intelligent Wireless Network, Architecture, Use Cases, Solutions, and Future Trends", Dec. 1, 2017, 10 pages.
Supplementary European Search Report dated Sep. 23, 2021 in connection with European Patent Application No. 19 86 0585, 10 pages.
China National Intellectual Property Administration, "The First Office Action," dated Mar. 17, 2023, in connection with Chinese Patent Application No. 201980059231.0, 18 pages.
Communication pursuant to Article 94(3) EPC dated Oct. 20, 2023, in connection with European Patent Application No. 19860585.9, 5 pages.
Office Action dated Nov. 26, 2023, in connection with Korean Patent Application No. 10-2021-7007431, 11 pages.
Summons to Attend Oral Proceedings Pursuant to Rule 115(1) EPC dated Aug. 19, 2025, in connection with European Application No. 19860585.9, 9 pages.

* cited by examiner

TELECOMMUNICATION NETWORKS

CROSS-REFERENCE TO RELATED APPLICATIONS

This application is a continuation of U.S. application Ser. No. 17/274,749 filed Mar. 9, 2021, which is a 371 of International Application No. PCT/KR2019/011842 filed on Sep. 11, 2019, which claims priority to United Kingdom Patent Application No. 1814753.8 filed on Sep. 11, 2018, the disclosures of which are herein incorporated by reference in their entirety.

BACKGROUND

1. Field

The present invention relates to improvements in the configuration and operation of certain functions in a telecommunication network. It particularly relates to placement and configuration of virtualised network functions and the functional split between functions in a Radio Access Network, RAN.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Vertical markets and industries are addressing a large diversity of heterogeneous services, use cases and applications in Fifth Generation, 5G, networks. It is currently common understanding that for networks to be able to satisfy those needs, a flexible, adaptable, and programmable architecture based on network slicing is required. Moreover, a move towards implementation via software and cloud-based services of the communications networks is already a reality, where network functions (NFs) are being transformed from programs running on dedicated hardware platforms to programs running over a shared pool of computational and communication resources.

In order to achieve the Key Performance Indicators (KPIs) envisioned by the next generation of mobile networking (i.e., 5G), the most relevant standardization bodies have already defined the fundamental structure of the architecture and the building blocks. By leveraging novel concepts of Software Defined Networking (SDN), Network Function Virtualization (NFV) and modularization, the new architecture proposed by relevant organization such as the 3rd Generation Partnership Project (3GPP) or the European Telecommunications Standards Institute (ETSI) will natively support the service diversity targeted by the future commercial ecosystem.

With the rise of network programmability, enabled by technologies such as software defined networking (SDN) and network function virtualization (NFV), NFs may be moved around in a cloud-based environment. On the other hand, the load fluctuations that different network slices will introduce in the network will impact the way on how such NFs are located in the cloud-based environment. To efficiently deal with changing load in such a scenario, which in turn translates into a varying resource consumption, the concept of resource elasticity has been introduced. The resource elasticity of a communications system is defined as the ability to gracefully adapt to load changes in an automatic manner such that at each point in time the available resources match the demand as closely and efficiently as possible. Hence, elasticity is intimately related to the system response when changes occur in the amount of available resources.

In general, the concept of elasticity for a NF is not directly applicable to legacy physical NFs (PNFs) which refers to a specific purpose-built hardware box that provides a well-defined NF. Especially for the case of distributed NFs, the functionality is provided by a physical unit that is the result of a thorough joint hardware/software design. Therefore, these have traditionally been designed without any major constraint on the available execution resources as they were expected to be always available by design, given some boundaries on the e.g., maximum number of user devices allowed.

In addition, in networks with virtualised NFs, joint hardware/software design is not possible anymore: VNFs are items of software that run on virtual containers on heterogeneous cloud platforms with standard interfaces. Therefore, in this new but already widely adopted scenario, expecting all the needed resources to be always available by design is not a reasonable proposition. Furthermore, current VNFs, and especially those in the RAN, have been designed under the assumption that required computational resources are always available and they may not be prepared for a shortage of computational resources. Indeed, when such resource outages occur (e.g., lack of CPU availability), current virtualised RAN implementations such as OpenAirInterface (OAI) just drop the frame being processed and, as a result, they see their performance severely degraded.

Hence, a challenge in virtualised networks is the need to perform graceful scaling of the computational resources required to execute the VNFs according to the load. Computational elasticity acts at the VNF level by introducing the ability to scale and orchestrate them and their complexity based on the available resources: in case of resource outage, VNFs are operable to adjust their operation to reduce their consumption of computational resources while, at the same time, minimizing the impact on network performance.

SUMMARY

Embodiments of the present invention aim to address problems and shortcomings in the prior art, whether identified explicitly herein or not.

According to the present invention there is provided an apparatus and method as set forth in the appended claims. Other features of the invention will be apparent from the dependent claims, and the description which follows.

According to a first aspect of the present invention, there is provided a method of configuring a base station, gNB, in a telecommunication network, the base station comprising a central unit, CU, and a distributed unit, DU, wherein the CU is arranged to perform virtualised network functions, VNFs, wherein the CU comprises an artificial intelligence, AI, engine operable to learn from computational metrics and to adjust the configuration of various VNFs, and wherein an F1 interface is used to exchange computational metrics between the CU and the DU.

Preferably, the step of adjusting the configuration of various VNFs comprises one or more of:

i) vertical scaling of the amount of processor, CPU, capability or storage allocated to a VNF;

ii) determination of the need to horizontally scale a VNF due to a physical limitation of resources in a single server; and iii) determination of an optimal migration time instant as well as a destination server.

Preferably, communication between individual VNFs and the AI engine is effected either directly or via an F1 interface.

Preferably, a determination of optimal computational resources allocation is based on historic observations of computational metrics Preferably, a functional split point between VNFs hosted in the CU and VNFs hosted in the DU is determined by the AI engine.

Preferably, changing the functional split point comprises moving one or more VNFs from the CU to the DU or vice-versa.

According to a second aspect of the present invention, there is provided a base station comprising a CU and DU connected by an F1 interface, wherein the CU is arranged to perform virtualised network functions, VNFs, and the CU comprises an artificial intelligence, AI, engine operable to learn from computational metrics and to adjust the configuration of various VNFs, and wherein the F1 interface is used to exchange computational metrics between the CU and the DU.

Preferably, the base station is arranged to perform the method of the first aspect.

Also, a method according to the present invention includes collecting data from a central unit, CU, and a distributed unit, DU, using F1 interface; determining whether to adjust a reconfiguration for the CU or DU, based on the collected data; adjusting the reconfiguration for at least one virtualised network function, VNF, of the CU, in case that the reconfiguration for the CU is determined, and adjusting the reconfiguration for at least one VNF of the DU, in case that the reconfiguration for the DU is determined, wherein the base station includes a central unit, CU, and a distributed unit, DU, wherein the CU is arranged to perform virtualised network functions, VNFs, wherein the CU includes an artificial intelligence, AI, engine operable to learn from computational metrics and to adjust the configuration of various VNFs, and wherein the F1 interface is used to exchange computational metrics between the CU and the DU.

Also, a base station according to the present invention includes a central unit, CU, including an artificial intelligence, AI, engine operable to learn from computational metrics and to adjust the configuration of various VNFs; and a distributed unit, DU, connected with the CU using an F1 interface, wherein the CU is arranged to perform virtualised network functions, VNFs, and wherein the F1 interface is used to exchange computational metrics between the CU and the DU, wherein the CU includes an artificial intelligence, AI, engine operable to learn from computational metrics and to adjust the configuration of various VNFs, and wherein the F1 interface is used to exchange computational metrics between the CU and the DU.

According to the present invention, a performance of NG-RAN functions may be optimized in a new 5G architectural framework of softwarized (or software-based) networks and gNB's having a CU-DU functional split.

DETAILED DESCRIPTION

Figure 1A:
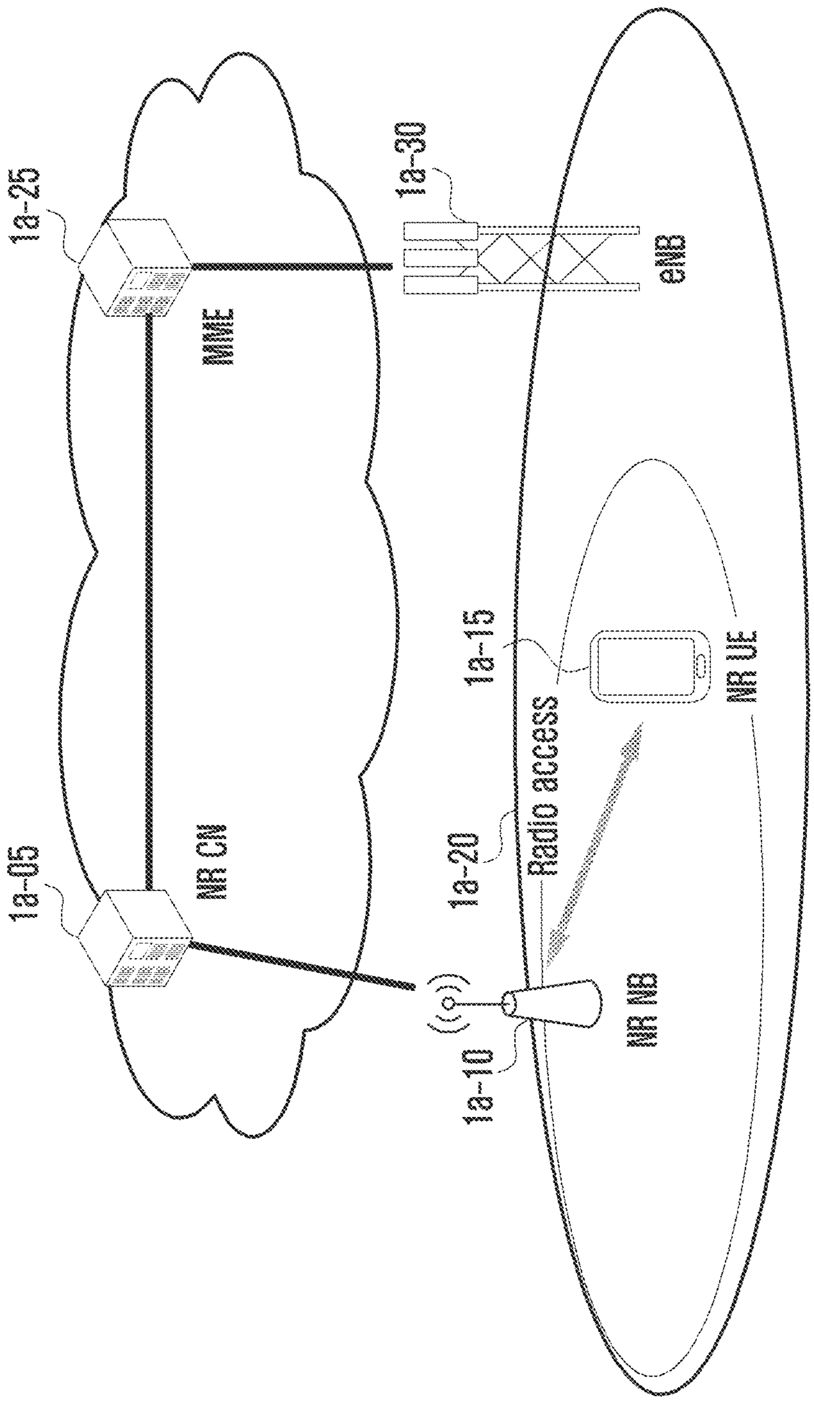
FIG. 1*a* illustrates a structure of a next-generation mobile communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the various embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

In accordance with an aspect of the disclosure, a method of indicating an SP SRS as a reference signal by a terminal is provided. The method includes receiving, from a base station, information for a sounding reference signal (SRS) configuration, receiving, from the base station, a medium access control (MAC) control element (CE) for activating a semi-persistent (SP) SRS, and transmitting, to the base station, an SRS on a first cell based on the information for the SRS configuration and the MAC CE for activating the SP SRS, wherein the MAC CE for activating the SP SRS includes an indicator for indicating whether serving cell information and bandwidth part (BWP) information for a reference signal associated with spatial relationship are present.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more central processing units (CPUs) within a device or a security multimedia card.

Managing and orchestrating the network and the corresponding VNFs through artificial intelligence (AI) and machine learning (ML) techniques are promising means of handling the additional complexity introduced by 5G Networks. In particular, embodiments of this invention utilise AI/analytics-assisted elastic management and orchestration of RAN functions that are executed on a Next Generation RAN (NG-RAN) architecture, i.e, a functional split is assumed within a gNB, with the central unit (CU) and distributed unit(s) (DU(s)) deployed at separate locations.

In the new 5G architectural framework of softwarized (or software-based) networks and gNB's having a CU-DU functional split, embodiments of the invention optimize the performance of NG-RAN functions by:

i) gathering computation-related data from gNB-CU relevant to the performance of the VNFs;

ii) leveraging the F1 interface to obtain data from gNB-DU; and iii) introducing an AI/data analytics engine that optimizes the elastic utilization of the computational and communication resources.

Embodiments of the present invention provide various advantages over the prior art. These include:

Exploitation of computational elasticity feature in NG-RAN functions, i.e., taking into account computational aspects and metrics in their execution, by means of utilizing the F1 interface to exchange computational metrics between gNB-CU and gNB-DU;

RAN function deployment method assisted by distributed AI/analytics engine at gNB-CU:

Determination of optimal computational resources allocation based on historic observations of computational metrics (e.g., CPU utilization, storage use, processing time, etc.). Applicable to NFs running both on gNB-CU (i.e., cloud-enabled) as well as in the DU (by making use of the reporting capabilities of F1);

Determination of optimal communication-related NF parameters (e.g., spectrum, modulation and coding parameters, segmentation, etc.) based on historic observations of NF performance both at gNB-CU and gNB-DU; and AI-assisted determination of the optimal functional split point on CU-DU interface based on computational metrics, hence triggering a re-orchestration of the RAN NFs which might involve moving a NF from the gNB-DU to the gNB-CU or vice versa. Although current 3GPP standardization currently assumes a fixed splitting point, greater flexibility is possible by allowing multiple split points.

Although a few preferred embodiments of the present invention have been shown and described, it will be appreciated by those skilled in the art that various changes and modifications might be made without departing from the scope of the invention, as defined in the appended claims.

For a better understanding of the invention, and to show how embodiments of the same may be carried into effect, reference will now be made, by way of example only, to the accompanying diagrammatic drawings in which:

FIG. 1*a* illustrates a structure of a next-generation mobile communication system according to an embodiment of the disclosure.

Figure 1B:
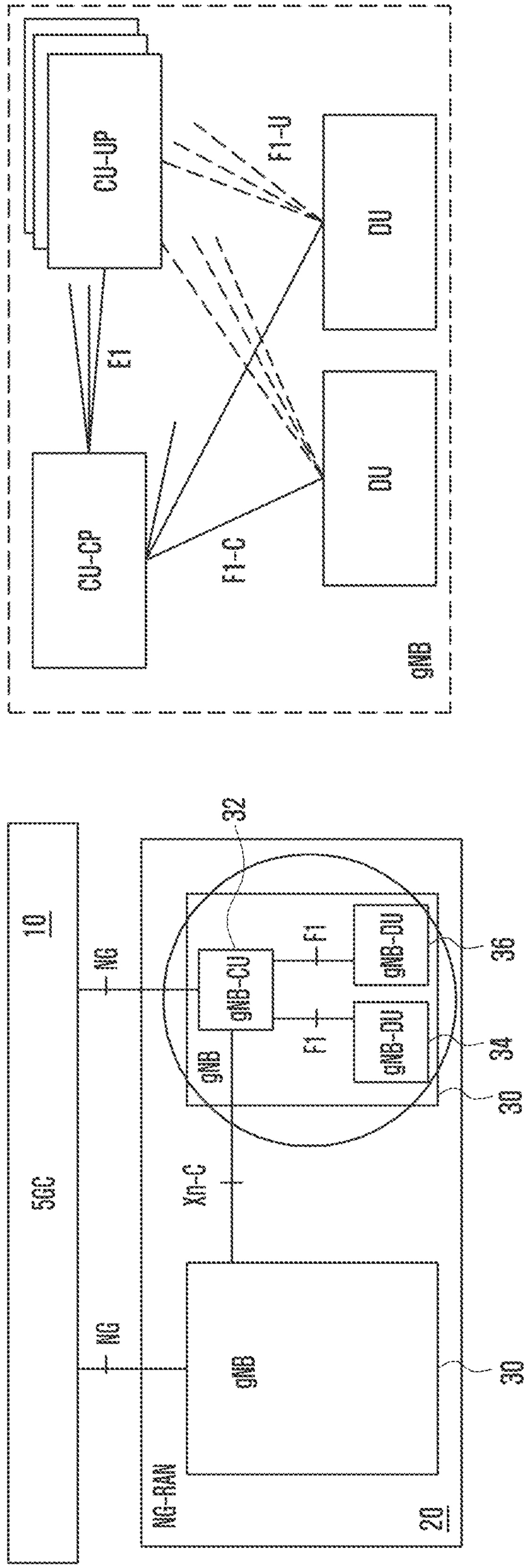
FIG. 1*b* shows a representation of 5G RAN architecture according to the prior art, including a detailed gNB schematic.
Figure 2A:
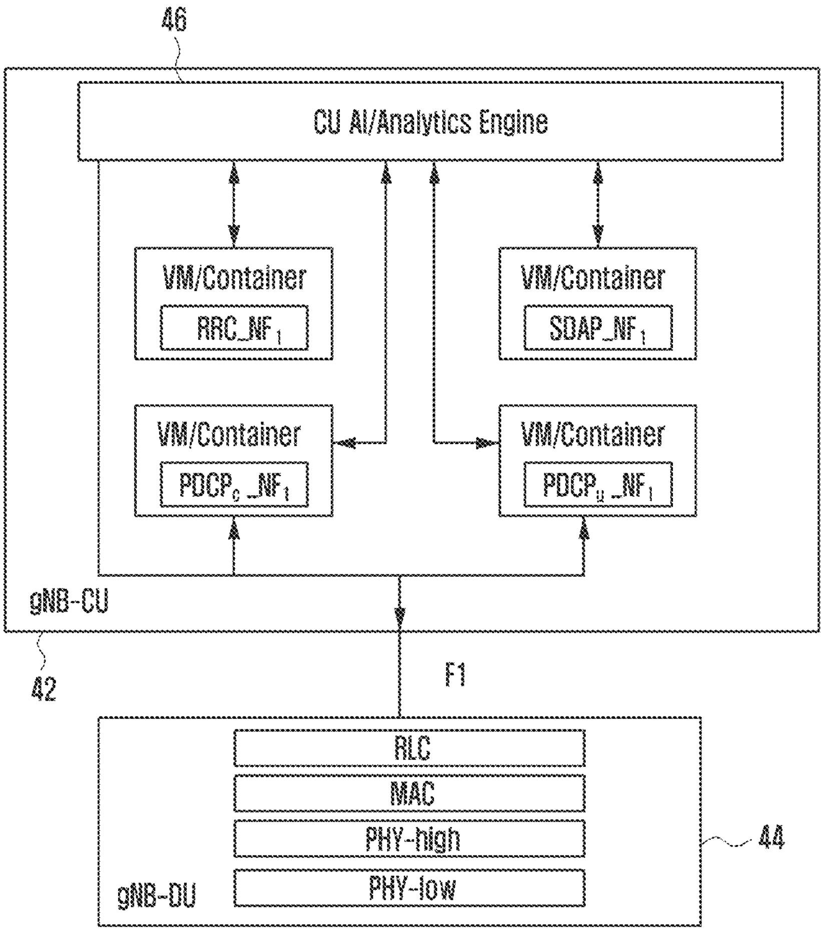
FIGS. 2*a* and 2*b* show two embodiments of the present invention representing different functional splits between CU and DU.
Figure 2B:
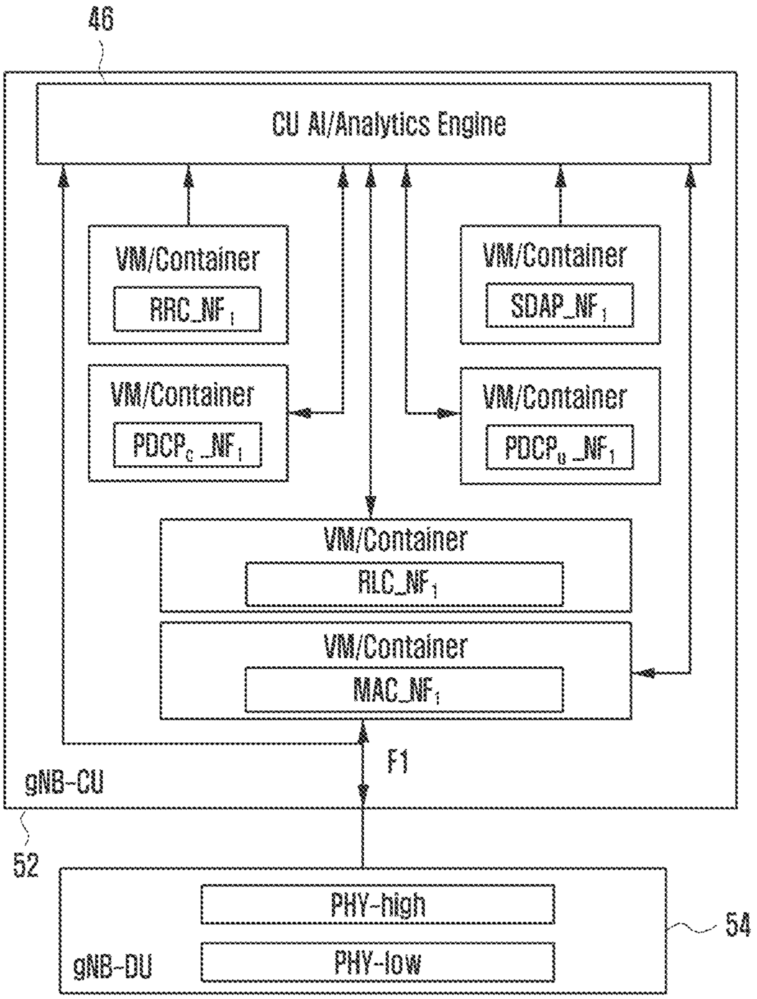
Figure 3:
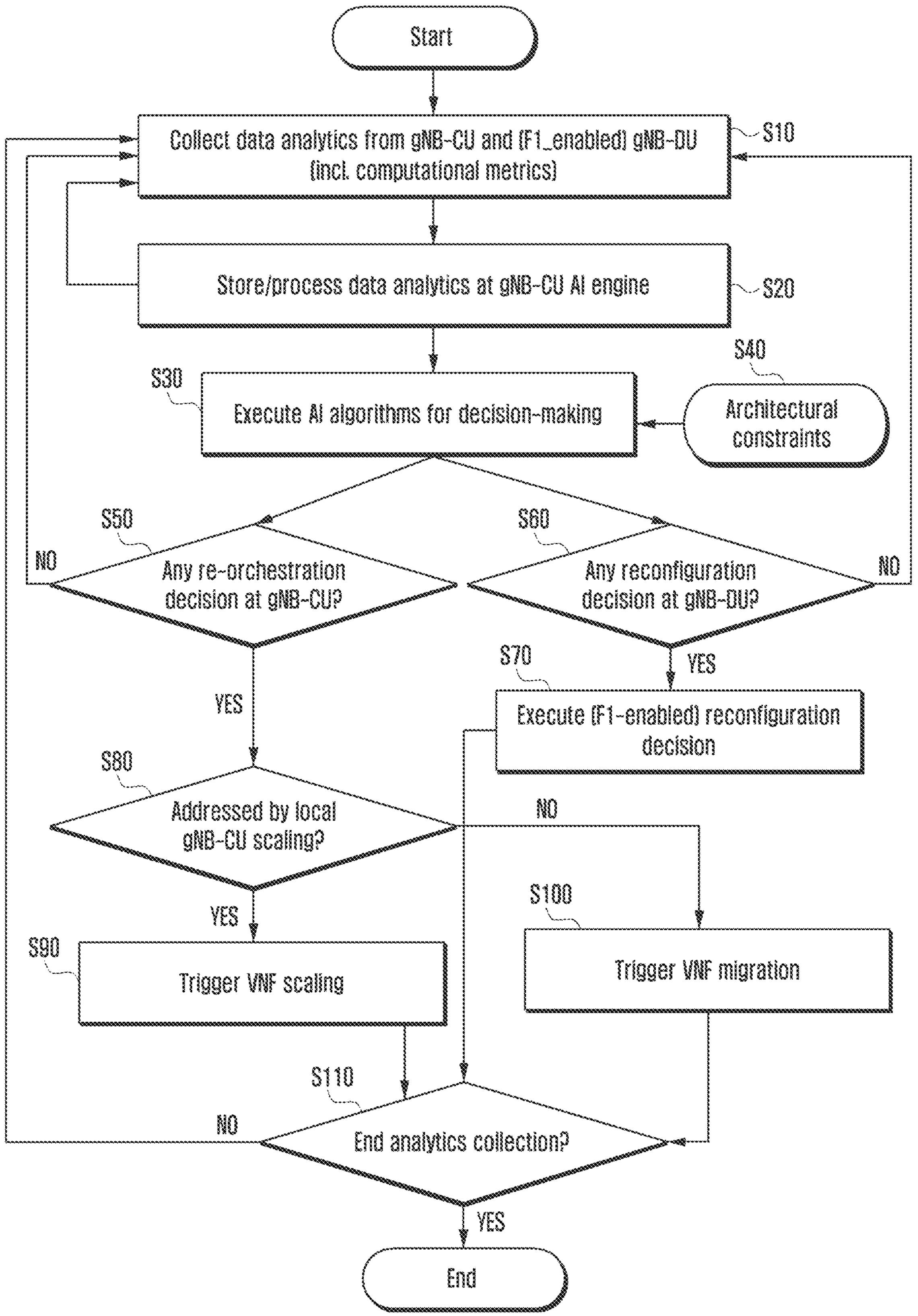
FIG. 3 shows a flowchart depicting a method according to an embodiment of the present invention.

FIG. 1*b* shows a representation of 5G RAN architecture according to the prior art, including a detailed gNB schematic;

FIGS. 2*a* and 2*b* show two embodiments of the present invention representing different functional splits between CU and DU; and FIG. 3 shows a flowchart depicting a method according to an embodiment of the present invention.

Embodiments of the present invention relate to a new design and deployment paradigm for the performance optimization of 5G RAN (a.k.a. NG-RAN) functions in virtualized 5G networks. Conventional RAN functions (e.g., inter-/intra-cell radio resource management (RRM), scheduling, modulation and coding selection (MCS), encoding and decoding, ciphering and deciphering, etc.) do not account in their design for the computational effort that is involved in their execution. Furthermore, they do not consider an underlying cloud-based RAN (C-RAN) functional split between gNB-CU and gNB-DU, which could mean that the execution of those functions could be carried out in either of the two units.

Embodiments of the present invention provide a 5G RAN design where computational metrics are monitored and fed to an Artificial Intelligence (AI) entity over a gNB CU-DU split deployment that leverages an augmented F1 interface.

One problem addressed by embodiments of the present invention is the capability for RAN functions to incorporate data analytics and AI-aided algorithms that take into account computational aspects of the functions such as CPU, memory or storage consumption in their design so that their outputs can be optimized with respect to the network performance.

Furthermore, the prior art 5G RAN architecture defined by 3GPP incorporates the F1 interface between gNB-CU and gNB-DU to support the functional split. According to embodiments of the present invention, this interface is augmented with computational metrics to enable an optimal decision on the placement of eligible RAN functions to be made, and hence on the functional split point itself. FIG. 1*a* and FIG. 1*b* illustrates the 5G RAN architecture, and is described in more detail in the following.

Referring to FIG. 1*a*, a radio access network (RAN) of the next-generation mobile communication system may include a next-generation evolved Node B (eNB) (NR gNB) or new radio node B (NR NB) 1*a*-10 and an NR core network (NR CN) node 1*a*-05. A terminal or a new radio user equipment (hereinafter referred to as a NR UE, a UE, or a terminal) 1*a*-15 may access an external network 1*a*-35 via the NR NB 1*a*-10 and the NR CN node 1*a*-05.

In FIG. 1*a*, the NR gNB 1*a*-10 corresponds to an evolved Node B (eNB) of a conventional LTE system. The NR gNB 1*a*-10 may be connected to the NR UE 1*a*-15 through a radio channel and may provide better service than a conventional node B. Since all user traffic is served through a shared channel in the next-generation mobile communication system, a device for collecting and scheduling status information of buffer statuses, available transmission power statuses, and channel statuses of UEs is required, and corresponds to the NR gNB 1*a*-10. One NR gNB 1*a*-10 generally controls a plurality of cells. The NR NB may have a bandwidth wider than the conventional maximum bandwidth in order to implement super-high-speed data transmission compared to conventional LTE, and may apply orthogonal frequency-division multiplexing (OFDM) through radio access technology, and may further apply beamforming technology. Further, an AMC (Adaptive Modulation and Coding) scheme of determining a modulation scheme and a channel coding rate is applied depending on the channel status of the UE. The NR CN 1*a*-05 performs a function of supporting mobility, establishing a bearer, and configuring QoS. The NR CN 1*a*-05 serves to perform a function of managing the mobility of the UE and perform various control functions, and is connected to a plurality of eNBs. Further, the next-generation mobile communication system may be linked to the conventional LTE system, and the NR CN 1*a*-05 is connected to an MME 1*a*-25 through a network interface. The MME 1*a*-25 is connected to an eNB 1*a*-30, which is the conventional eNB.

FIG. 1*b* shows an another aspects of the standardized NG-RAN architecture as defined by 3GPP, which includes a Core network, 5GC, 10, connected to an NG-RAN 20. The NG-RAN comprises a plurality of gNBs 30 (although only 2 are shown for brevity). Each gNB includes a CU 32 and, in this case, a number of DUs 34, 36. The CU 32 and the DUs 34, 36 are each connected by an F1 interface.

As shown in FIG. 1*b*, there is a functional split assumed between gNB-CU 32 and gNB-DU 34. 36. Multiple gNBs 30 can be interconnected through the Xn interface, as shown, and one gNB may consist of 1 gNB-CU and 1 or more gNB-DU(s) (note that 2 DUs are shown in FIG. 1*b*).

Furthermore, with the currently agreed functional split in 3GPP, the gNB-CU user plane (UP) hosts Service Data Adaptation Protocol (SDAP) and Packet Data Convergence Protocol (PDCP), the control plane (CP) hosts Radio Resource Control (RRC) and PDCP, and the lower layer radio protocols are hosted in the DU. The gNB-CU and gNB-DU are connected via the F1 interface. One gNB-DU is, in principle, connected to only one gNB-CU (although for resiliency purposes, it could be connected to multiple gNB-CUs by appropriate implementation). The gNB-CU 32 and the connected gNB-DUs 34, 36 are only visible to other gNBs and the 5GC 10 as a single gNB.

FIGS. 2*a* and 2*b* show the proposed NG-RAN architecture according to embodiments of the present invention in the form of two different functional splits: FIG. 2*a* being at PDCP level; and FIG. 2*b* at MAC level. The cloud-enabled gNB-CU is depicted as running NFs belonging to each protocol layer in Virtual Machines (VMs) or containers. Each layer may have several NFs being run on different VMs/containers, but for sake of simplicity, here only one NF per layer is shown. Each of the NFs (and the corresponding virtual instance that hosts it) communicates with an AI/analytics engine 46 that gathers all relevant data needed to enable computational elasticity at the RAN.

Furthermore, the F1 interface also feeds relevant metrics to the AI/analytics engine 46, particularly if, as in one embodiment, it is extended with computation-related metrics that could help decide the optimal computational resource allocation at the gNB-CU 42, 52. The interfaces with the AI/analytics engine are all shown as bidirectional with double-arrows. as not only is data gathered but decisions made by the intelligent entity 46 are propagated about the system. Reconfiguration decisions at the gNB-DU 44, 54 based on the AI engine outputs may also be implemented via the F1 interface, if this interface is augmented to support such functionality, as it is in an embodiment of the present invention.

The introduction of an AI engine 46 at the gNB-CU 42, 52 enables a more intelligent orchestration of the computational resources of the edge cloud. This is of particular importance due to the scarcity of resources at the edge cloud, which unlike the central cloud cannot be assumed to be always available. In particular, the performance of the prominent task of scaling and orchestrating the VMs/containers hosting the relevant virtualized RAN network functions can be boosted. This particular task is important for the efficient operation of RAN functions, as the timescales involved in RAN functions are usually very tight and the edge computational resources are usually limited (as opposed to the central cloud), hence requiring an optimized utilization of the resources.

Examples of VNF orchestration-related decisions that leverage on AI are the following:

i) vertical scaling of the amount of CPU or storage allocated to a VM/container;

ii) determination of the need to horizontally scale a VM/container due to the physical limitation of resources in a single server; and iii) determination of an optimal migration time instant as well as the destination server.

Since each service could be managed as an independent entity, this enables Machine Learning (ML) models to be properly used for auto-scaling proposes. Reinforcement learning solutions are particularly suitable for these tasks due to their ability to learn and continuously update an optimal orchestration policy based on on-line decisions that can be evaluated using the reward of the policy. The frequency of the policy update, however, can be adjusted as desired (e.g., week-based, day-based, hour-based, continuous, etc.), although the learning of the system does not need to be interrupted.

Moreover, the intelligence of the system can be further leveraged in two other ways:

1) To migrate VNFs among gNB-CUs either due to an overloaded edge node (hence requiring either the geographical area where the serviced load resides to be covered by overlapping gNB-DUs attached to the involved gNB-CUs, or the relevant gNB-DUs to be connected to both gNB-CUs at the same time) or due to the mobility of the users, which could be anticipated using the predictive capabilities of AI algorithms.

2) To introduce flexibility with respect to the setting of the functional split point, where data analytics providing information on the performance of the different NFs would be provided as inputs to the AI engine for a decision on the split option. There is a preference in 3GPP to be open to all identified split options, and even further to the variants thereof.

As mentioned above, the distributed AI/analytics engine 46 at the gNB-CU 42, 52 collects data (including computation-related metrics such as CPU or storage consumption) S10 from the VNFs running locally as well as data from the gNB-DU(s) 44, 54 that the F1 interface is equipped to carry. This is a continuous process that lasts until the analytics algorithms yield a new decision to improve performance. Such a decision, depending on the architectural constraints (i.e., data gathering capabilities, what types of decisions can be executed internally at the edge node cloud, and which could be propagated to the gNB-DU(s) 44, 54 via the F1 interface) could yield a re-orchestration of the VNFs and resources at the gNB-CU 42, 52 and/or a reconfiguration of the gNB-DU(s) 44, 54. The re-orchestration decision could imply a scaling of the VNFs/resources at the gNB-CU or a migration to another edge node.

FIG. 3 shows a flowchart representing the basic operation of an embodiment of the invention, which is detailed as follows. The AI/analytics engine collects data from gNB-CU and gNB-DU via F1 interface (S10). Such data is stored (S20) and processed if needed so that a data history of the operation of the gNB becomes available over time. Data gathering (S10) and storage/processing operations (S20) are repeated until the AI engine detects the need to execute a reconfiguration decision (S30), a decision that should be made taking the architectural constraints (S40) into account. Such constraints could include the VNFs available for orchestration, the possibility or lack thereof to modify the split point, the permitted split points, etc.

When a re-orchestration decision is made, if it affects the gNB-CU VNFs (S50), the system checks whether such a decision only involves local scaling of the resources associated to the gNB-CU VNFs (S80). If that is the case, such a VNF scaling is performed (S90). If not, a migration of the relevant VNF(s) is triggered (S100) to another server of the same edge cloud datacenter or to another edge cloud node. At this stage, the system checks whether the data analytics gathering process should be halted (S110). If that is not the case, flow goes back to S10, otherwise it ends.

In case the decision S30 involves the reconfiguration of the gNB-DU(s) (S60), then the augmented F1 interface is utilized to carry the command to execute such a decision at the gNB-DU (S70). Again, at this stage, the system checks whether the data analytics gathering process should be halted (S110). If that is not the case, flow goes back to S10, otherwise it ends.

This could be implemented with a control loop and global orchestration capabilities (such as the Orchestration Adaptive Manager (OAM)), as well as an additional management system at the gNB-DU (such as the Touchpoint Adaptive Manager (TAM)), both part of a service-oriented infrastructure. As mentioned, this would also require the F1 interface to be extended with monitoring and management services, and control loop management service used by OAM and TAM.

Figure 4:
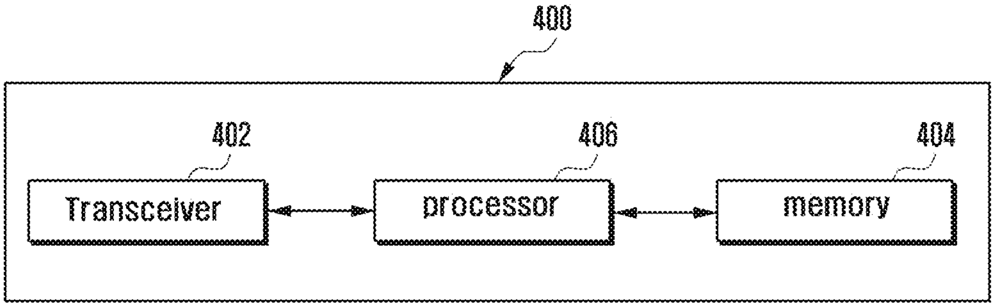
FIG. 4 is a block diagram of a gNB-DU according to one embodiments of the present disclosure.

FIG. 4 is a block diagram of a gNB-DU according to one embodiments of the present disclosure.

With reference to FIG. 4, a gNB-DU 400 of embodiments includes a transceiver 402, a storage unit 404 and a processor 406.

The transceiver 402 is capable of transmitting/receiving signals to/from UE and/or CU.

The storage unit 404 is capable of storing at least one of the following: information related to the gNB-DU 400 and information transmitted/received via the transceiver 402. In the embodiment, the storage unit 404 is capable of storing context information regarding UE and buffering transfer data.

The processor 406 is capable of controlling operations of the gNB-DU 400. The processor 406 is capable of controlling the gNB-DU to perform operations related to gNB-DU s as described in the embodiments.

Figure 5:
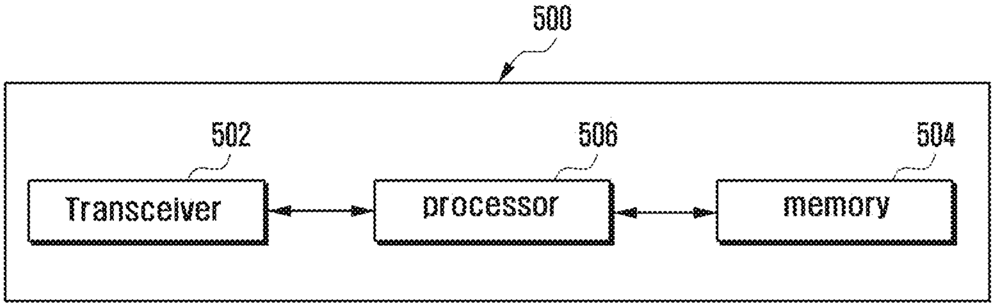
FIG. 5 is a block diagram of a gNB-CU according to one embodiments of the present disclosure.

FIG. 5 is a block diagram of a gNB-CU according to one embodiments of the present disclosure.

With reference to FIG. 5, a gNB-CU 500 of embodiments includes a transceiver 502, a storage unit 504 and a processor 506.

The transceiver 502 is capable of transmitting/receiving signals to/from UE and/or DUs.

The storage unit 504 is capable of storing at least one of the following: information related to the gNB-CU 500 and information transmitted/received via the transceiver 502.

The processor 506 is capable of controlling operations of the gNB-CU 500. The processor 506 is capable of controlling the gNB-CU to perform operations related to gNB-CU as described in the embodiments. Specially, the processor 506 is configured to perform at least one function of AI/analytics engine described above embodiments. The AI/analytics engine is configured to collect, data from the CU and the DU using F1 interface. Also the AI/analytics engine is configured to determine whether to adjust a reconfiguration for the CU or DU, based on the collected data. Also the AI/analytics engine is configured to adjust the reconfiguration for at least one virtualised network function, VNF, of the CU, in case that the reconfiguration for the CU is determined. Also the AI/analytics engine is configured to adjust the reconfiguration for at least one VNF of the DU, in case that the reconfiguration for the DU is determined.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method performed by a central unit (CU) of a base station in a communication system, the method comprising:

receiving, from at least one distributed unit (DU) of the base station over an F1 interface, status information associated with resource utilization;

performing, by an artificial intelligence (AI) engine in the CU, analysis on the status information associated with resource utilization; and determining, a functional split point between the CU and the DU.

2. The method of claim 1, further comprising:

transmitting, information on the determined functional split point to the at least one DU over the F1 interface.

3. The method of claim 1, wherein the status information includes at least one of computational metrics, central processing unit (CPU) availability, or storage consumption of the at least one DU.

4. The method of claim 1, wherein the determining the functional split point further includes: determining at least one communication layer used by the at least one DU.

5. The method of claim 1, wherein the base station includes communication layers comprising a radio resource control (RRC) layer, a service data adaptation protocol (SDAP) layer, a packet data convergence protocol (PDCP) layer, a radio link control (RLC) layer, a medium access control (MAC) layer and a physical (PHY) layer, and wherein a first part of the communication layers is performed by the CU and a second part of the communication layers is performed by the DU.

6. A method performed by a distributed unit (DU) of a base station in a communication systems, the method comprising:

transmitting, to a central unit (CU) of the base station over an F1 interface, status information associated with resource utilization, wherein the CU comprises an artificial intelligence (AI) engine; and receiving, from the CU over the F1 interface, information on a functional split point between the CU and the DU, wherein the functional split point is determined based on an analysis on the status information associated with resource utilization performed by the AI engine.

7. The method of claim 6, wherein the status information includes at least one of computational metrics, central processing unit (CPU) availability, or storage consumption of the DU.

8. The method of claim 6, wherein the information on the functional split point between the CU and the DU includes information on at least one communication layer used by the DU.

9. The method of claim 6, wherein the base station includes communication layers comprising a radio resource control (RRC) layer, a service data adaptation protocol (SDAP) layer, a packet data convergence protocol (PDCP) layer, a radio link control (RLC) layer, a medium access control (MAC) layer and a physical (PHY) layer, and wherein a first part of the communication layers is performed by the CU and a second part of the communication layers is performed by the DU.

10. A central unit (CU) of a base station in a communication system, the CU comprising:

an artificial intelligence (AI) engine;

a transceiver; and a controller coupled with the transceiver and configured to:

receive, from at least one distributed unit (DU) of the base station over an F1 interface, status information associated with resource utilization, perform, by an artificial intelligence (AI) engine in the CU, analysis on the status information associated with resource utilization, and determine, a functional split point between the CU and the DU.

11. The CU of claim 10, transmit, information on the determined functional split point to the at least one DU over the F1 interface.

12. The CU of claim 10, wherein the status information includes at least one of computational metrics, central processing unit (CPU) availability, or storage consumption of the at least one DU.

13. The CU of claim 10, wherein the controller is further configured to: determine at least one communication layer used by the at least one DU.

14. The CU of claim 10, wherein the base station includes communication layers comprising a radio resource control (RRC) layer, a service data adaptation protocol (SDAP) layer, a packet data convergence protocol (PDCP) layer, a radio link control (RLC) layer, a medium access control (MAC) layer and a physical (PHY) layer, and wherein a first part of the communication layers is performed by the CU and a second part of the communication layers is performed by the DU.

15. A distributed unit (DU) of a base station in a communication system, the DU comprising:

a transceiver; and a controller coupled with the transceiver and configured to:

transmit, to a central unit (CU) of the base station over an F1 interface, status information associated with resource utilization, wherein the CU comprises an artificial intelligence (AI) engine, and receive, from the CU over the F1 interface, information on a functional split point between the CU and the DU, wherein the functional split point is determined based on an analysis on the status information associated with resource utilization performed by the AI engine.

16. The DU of claim 15, wherein the status information includes at least one of computational metrics, central processing unit (CPU) availability, or storage consumption of the DU.

17. The DU of claim 15, wherein the information on the functional split point between the CU and the DU includes information on at least one communication layer used by the DU.

18. The DU of claim 15, wherein the base station includes communication layers comprising radio resource control (RRC) layer, service data adaptation protocol (SDAP) layer, packet data convergence protocol (PDCP) layer, radio link control (RLC) layer, medium access control (MAC) layer and physical (PHY) layer, and wherein a first part of the communication layers is performed by the CU and a second part of the communication layers is performed by the DU.

* * * * *